(No Model.) 3 Sheets—Sheet 1.

R. HIRSH.
REFRIGERATOR.

No. 519,711. Patented May 15, 1894.

WITNESSES:
H. A. Carhart.
D. May Goodrich.

INVENTOR
Ralph Hirsh.
By Smith & Denison
ATTORNEYS (No Model.) 3 Sheets—Sheet 2.

R. HIRSH.
REFRIGERATOR.

No. 519,711. Patented May 15, 1894.

WITNESSES:
H. A. Carhart,
D. May Goodrich.

INVENTOR
Ralph Hirsh,
By Smith & Denison
ATTORNEYS.

(No Model.) 3 Sheets—Sheet 3.

R. HIRSH.
REFRIGERATOR.

No. 519,711. Patented May 15, 1894.

WITNESSES:
H. A. Carhart.
D. May Goodrich.

INVENTOR
Ralph Hirsh.
By Smith & Denison
ATTORNEYS.

UNITED STATES PATENT OFFICE.

RALPH HIRSH, OF SYRACUSE, NEW YORK.

REFRIGERATOR.

SPECIFICATION forming part of Letters Patent No. 519,711, dated May 15, 1894.

Application filed April 20, 1893. Serial No. 471,084. (No model.)

*To all whom it may concern:*

Be it known that I, RALPH HIRSH, of Syracuse, in the county of Onondaga, in the State of New York, have invented new and useful Improvements in Refrigerators, of which the following, taken in connection with the accompanying drawings, is a full, clear, and exact description.

My invention relates to refrigerators which are provided with a flue system for establishing and maintaining a circulation of cold air through the provision chamber.

My object is to improve the construction and operation of a refrigerator, by providing a primary or mixing tank in which the refrigerating compound, mixture or chemical salts are first commingled or dissolved in water or other liquid; by providing a main refrigerating tank into which the contents of the primary tank are conducted, said refrigerating tank constituting the top of the provision chamber, as well as the top of the flues which constitute the cold-storage chamber, and extending obliquely across the top of said flues to increase the radiating surface to the maximum; by providing the provision chamber with an auxiliary refrigerating tank or tanks, directly or intermittently connected to the main refrigerating tank, the inner walls of which constitute additional cold radiating surface within said chamber, said auxiliary tank or tanks being somewhat analogous to water legs in steam boilers; by providing a valve system by which the apertures in the wall of the provision chamber connecting it to the cold storage chamber, or flues, are automatically closed when the door is opened, and opened by the closing of the door, whereby all loss of cold air from said flues incident to the opening of said door is prevented; by providing it with a water tank suspended or supported in the main refrigerating tank, in such manner that its bottom, rear or inner end, and its side walls are in direct contact with the refrigerating solution.

My invention consists in the several novel features of construction and operation hereinafter described and specifically set forth in the claims hereunto annexed. It is constructed as follows, reference being had to the accompanying drawings, in which—

Figure 1:
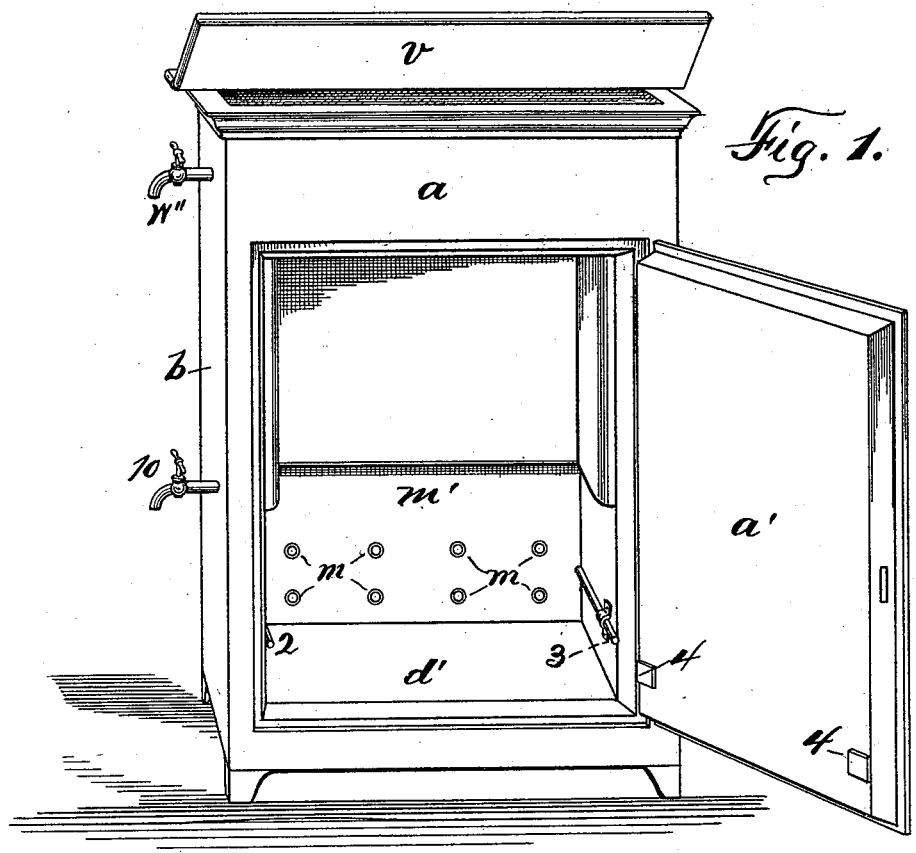
Figure 6:
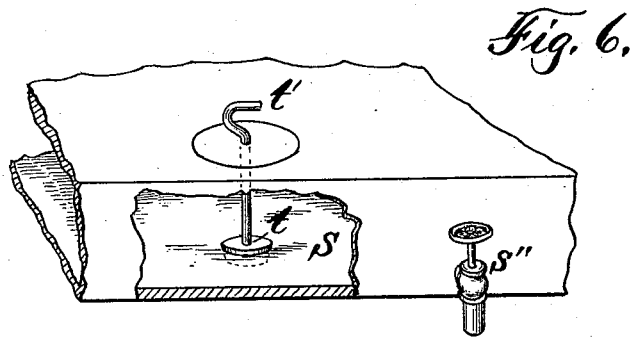
Figure 2:
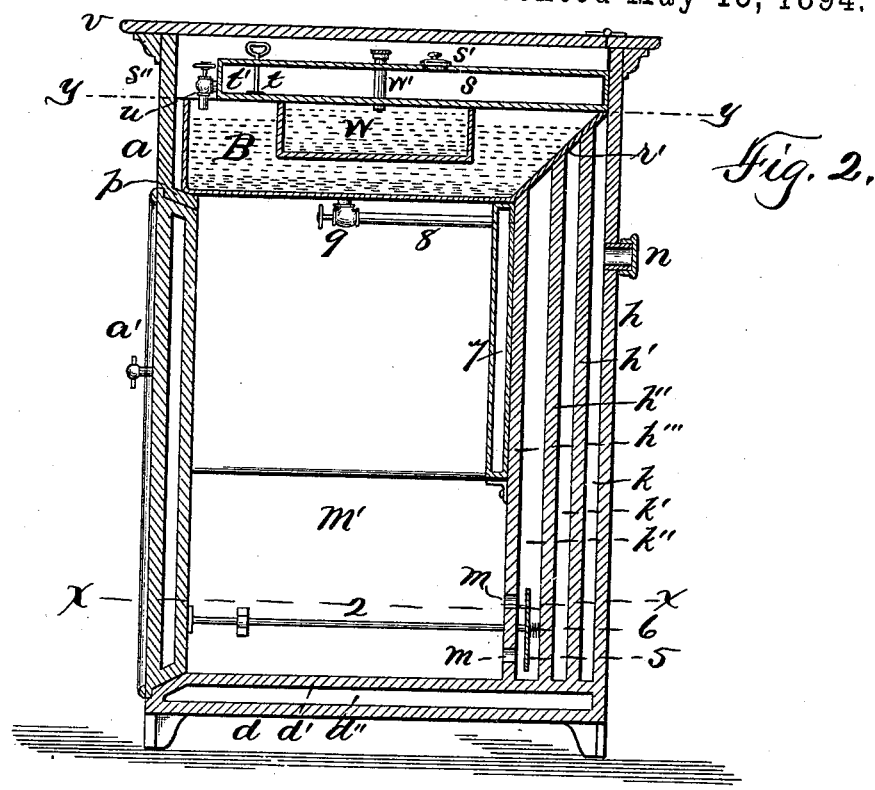
Figure 5:
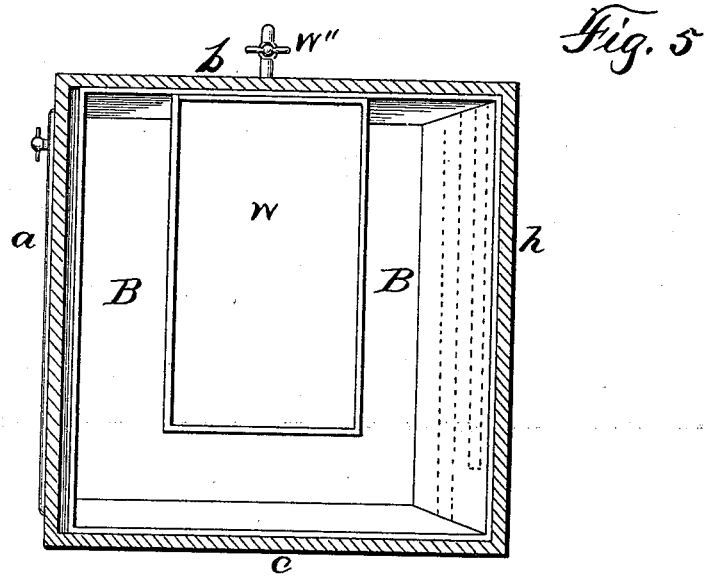
Figure 3:
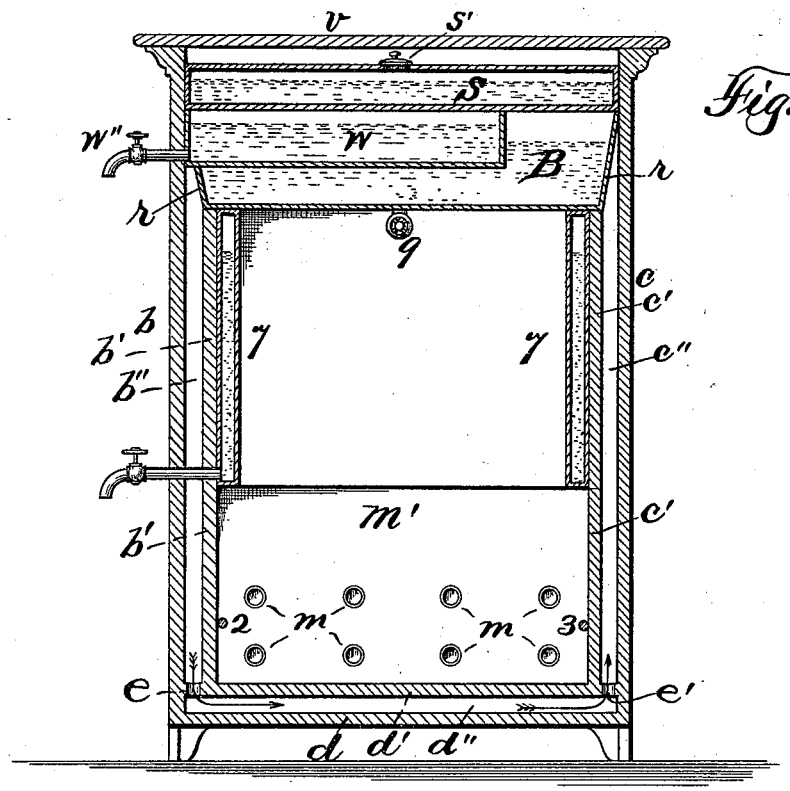
Figure 4:
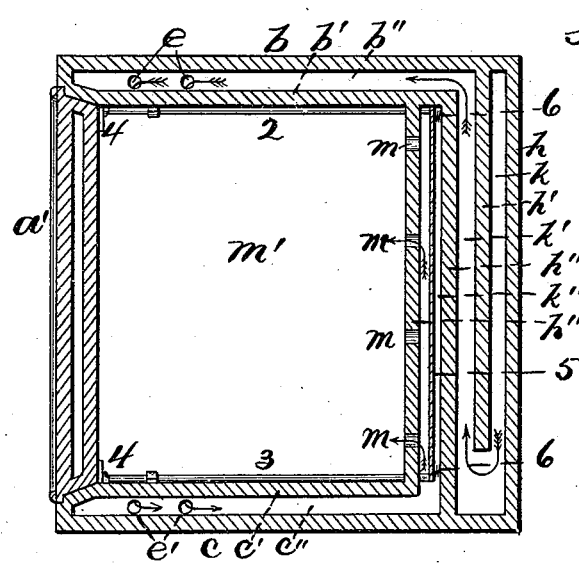

Figure 1, is a perspective of the refrigerator, showing the door open. Fig. 2, is a vertical longitudinal section thereof, (from front to rear.) Fig. 3, is a vertical transverse section thereof. Fig. 4, is a horizontal section, on line $x\,x$, in Fig. 2. Fig. 5, is a like view on line $y\,y$, Fig. 2. Fig. 6, is a detail of part of the primary tank, broken out to show more plainly the plug by which its bottom is closed.

The refrigerator comprises a front wall —$a$— provided with a door —$a'$—; outer side walls —$b$— and —$c$—, inner side walls —$b'$— and —$c'$— separated and creating flue chambers —$b''$—$c''$— respectively; a bottom —$d$— and an inner bottom —$d'$— with a flue chamber —$d''$— between them, which is connected to the flues —$b''$—$c''$— by the ports —$e$— and —$e'$—, respectively; a rear wall —$h$— and parallel vertical partitions —$h'$—$h''$— and —$h'''$— creating the flues —$k$—$k'$— and —$k''$—, and flue —$k$— having a direct connection to the rear flue —$k'$—, the flue —$k'$— to the side flue —$b''$— and the side flue —$c''$— to the flue —$k''$—, whereby a circulation is established from the flue —$k$— through the flues —$k'$—, —$b''$—, —$d''$—, —$c''$— and —$k''$—, and the ports —$m$— into the provision chamber —$m'$—, the rear wall —$h$— having an air inlet opening —$n$—, all of which is substantially as shown in the Letters Patent granted to me September 1, 1891, No. 458,726.

B, is the main refrigerating tank supported in front upon the ledge or shelf —$p$—, at the sides upon the inner walls —$b'$—$c'$—, and having its sides —$r$— extending obliquely across and forming the tops of the flues —$b''$—, —$c''$—, and having its rear wall extending obliquely across and supported by the walls $h'$, $h''$, $h'''$ and closing the tops of the flues $k$, $k'$ and $k''$, and its bottom forming the top of the provision chamber, while the walls $b'$, $c'$ constitute its sides, and with the bottom —$d'$— are respectively its sides and bottom. Upon the main tank, the primary tank —$s$— is placed having in its top a feeding aperture and closure —$s'$—, and in its front with a two-way cock —$s''$— or other faucet, and in its bottom with a draw-off aperture and plug —$t$— connected to a rod —$t'$— extending up through the top of the tank and there provided with a suitable handle, whereby the plug is raised and the contents of the tank are quickly conducted into the main tank, the cock being used, if at all, when a smaller quantity is to be drawn off. This tank does not extend to the front of the main tank, creating an open space —$u$—, through which liquids or other substances can be added to the main tank when the cover —$v$— of the refrigerator is opened.

A water cooling tank —$w$— is suspended from the top of the main tank, in such manner that usually its bottom, sides and one end are in direct contact or immersed in the refrigerating solution. The water-tank is provided with a feed or supply inlet —$w'$— and a draw-off faucet —$w''$—.

Upon the walls —$b'$—$c'$—, in suitable guides, the valve rods —2—3— are mounted, the outer ends projecting so as to engage with the wear-plates —4— upon the door, and —5— is a valve structure secured to the inner ends of said rods, and supported thereby in the flue —$k''$—, and —6— are springs whereby the valve closes all of the ports —$m$— in the wall —$h'''$— whenever the door is opened, thereby preventing any escape of cold air from the cold-air storage reservoir when the door is opened and while it is open, said valve being opened when the door is closed and by its closing to permit the flow of cold air thereinto once more. Inasmuch as this feature is believed to be wholly novel, I do not limit myself to the precise construction shown, but claim the full benefit of all mechanical equivalents, and all mechanisms whereby the cold-air inlet ports are automatically closed by the opening of the door, and reopened by its closing.

Within the provision reservoir and extending across the back and the sides, is an auxiliary refrigerating tank —7—, which is shown as connected to the main tank by the pipe —8— and the cut-off valve —9—, to which access is had by opening the door, and by which any desired quantity can be let into the auxiliary tank. Or said tank may be directly connected to the main tank, so as to be always full of the solution, by any ordinary means, or manner desired. Its contents are drawn off by the two-way cock or faucet —10—. This auxiliary tank increases the area of the cold radiating surface of or in the provision chamber, and by its use the temperature of said chamber is more quickly restored to the normal degree especially when the door is frequently opened.

The chemical salts or other ingredients, are used in making the solution by mixing them with a given quantity of water or other suitable liquid, and can be mostly recovered from the solution drawn off, by evaporating the water in any ordinary manner, and can be used over and over again.

What I claim as my invention, and desire to secure by Letters Patent, is—

1. In a refrigerator of the class described the combination with the provision chamber of a main refrigerating tank above said chamber, a primary mixing chamber above the main tank, and means to intermittently connect them, and a vertical auxiliary tank or tanks within and parallel and contiguous to the vertical wall of said chamber and connected to said main tank.

2. In a refrigerator, the combination with the cold-air storage chamber, around the sides and back thereof, of the main refrigerating tank having oblique walls closing the top of said chamber.

3. In a refrigerator, the combination with the cold-air storage reservoir around the back and sides thereof, of the main refrigerating tank upon and obliquely closing the top of said reservoir, and the primary mixing tank, above said main tank.

4. In a refrigerator, the combination with a stationary main refrigerating tank above the provision chamber, and an auxiliary refrigerating tank above the main tank, of a stationary water tank of lesser size and within the main tank and suspended from the top thereof, an induction pipe therefor inserted through the auxiliary tank and the top of the main tank, and an eduction pipe therefrom inserted through the outer wall of the refrigerator body.

5. In a refrigerator, the combination with the main refrigerating tank, and the primary tank thereupon, of a water tank inclosed within and suspended from the top of the main tank, which is the bottom of the primary tank, and adapted to be immersed in the refrigerating solution in the main tank.

6. In a refrigerator, a provision chamber, a cold-air-storage reservoir auxiliary thereto and in rear thereof, a vertical partition between them, valve apertures in said partition, a valve plate in rear of said partition adapted to close said apertures, rods extending through said partition and along the sides of the provision chamber, a door to said chamber adapted at its stiles to engage with said rods and simultaneously actuate them to open said apertures substantially at the instant the door is shut, and to release them to close them when the door starts to open, and springs behind said plate, in combination.

In witness whereof I have hereunto set my hand this 18th day of April, 1893.

RALPH HIRSH.

In presence of—
C. B. KINNE,
HOWARD P. DENISON.